(12) United States Patent
Fontaine et al.

(10) Patent No.: US 11,835,301 B2
(45) Date of Patent: Dec. 5, 2023

(54) MODULAR HEAT EXCHANGER AND METHOD OF ASSEMBLY THEREOF

(71) Applicant: ECOINNOVATION TECHNOLOGIES INCORPORÉE, Saint-Louis-de-Gonzague (CA)

(72) Inventors: Marc Fontaine, Mascouche (CA); Antoine Malouin, St-Jerôme (CA)

(*) Notice: Subject to any disclaimer, the term of this patent is extended or adjusted under 35 U.S.C. 154(b) by 0 days.

(21) Appl. No.: 17/703,358

(22) Filed: Mar. 24, 2022

(65) Prior Publication Data

US 2022/0325959 A1 Oct. 13, 2022

Related U.S. Application Data

(60) Provisional application No. 63/171,963, filed on Apr. 7, 2021.

(51) Int. Cl.
*F28D 7/10* (2006.01)
*F28F 13/12* (2006.01)
*F28D 21/00* (2006.01)

(52) U.S. Cl.
CPC .......... *F28D 7/10* (2013.01); *F28D 21/0012* (2013.01); *F28F 13/12* (2013.01)

(58) Field of Classification Search
CPC ........ F28D 7/10; F28D 7/106; F28D 21/0012; F28F 13/12; F28F 2215/08; F28F 2215/10
See application file for complete search history.

(56) References Cited

U.S. PATENT DOCUMENTS

| | | |
|---|---|---|
| 3,453,840 A | 7/1969 | Nagakura et al. |
| 4,163,474 A | 8/1979 | MacDonald et al. |
| 4,194,560 A | 3/1980 | Matsuzaki |
| 4,256,170 A | 3/1981 | Crump |
| 4,284,133 A | 8/1981 | Gianni et al. |
| 4,372,374 A | 2/1983 | Lee |
| 4,451,966 A | 6/1984 | Lee |
| 4,964,459 A | 10/1990 | Stenlund |
| 5,375,654 A | 12/1994 | Hougland et al. |
| 5,732,769 A | 3/1998 | Staffa |
| 5,740,857 A * | 4/1998 | Thompson .............. F28D 7/106 165/47 |
| 6,920,917 B2 | 7/2005 | Inoue et al. |
| 6,926,069 B1 | 8/2005 | Roffelsen |
| 7,191,824 B2 | 3/2007 | Wu et al. |

(Continued)

FOREIGN PATENT DOCUMENTS

| | | |
|---|---|---|
| EP | 0108525 A1 | 5/1984 |
| EP | 2963373 A1 | 1/2016 |

(Continued)

*Primary Examiner* — Eric S Ruppert (57) ABSTRACT

A heat exchanger for recovering heat from wastewater leaving a building and transferring the heat to freshwater for use in the building; it has an inner pipe defining an inner space for receiving wastewater that is being evacuated from the building; an outer pipe, wherein the inner pipe is placed in the outer pipe, and the outer surface of the inner pipe and the inner surface of the outer pipe define an interstitial space for receiving freshwater; a turbulator sheet located in the interstitial space that causes or increases turbulence of the freshwater for improving heat transfer between the freshwater and the wastewater; and two couplings, one on either end of the outer pipe and the inner pipe.

15 Claims, 10 Drawing Sheets

(56) References Cited

U.S. PATENT DOCUMENTS

| | | |
|---|---|---|
| 9,982,954 B1 | 5/2018 | Jarmon |
| 2009/0166019 A1 | 7/2009 | Tokizaki et al. |
| 2015/0316294 A1 | 11/2015 | Andersson |
| 2016/0216045 A1 | 7/2016 | Chan |
| 2017/0038158 A1 | 2/2017 | Milton |

FOREIGN PATENT DOCUMENTS

| | | | | |
|---|---|---|---|---|
| GB | 977579 A | 12/1964 | | |
| GB | 2096757 A | 10/1982 | | |
| JP | 08170890 A | * 7/1996 | ............... | F28F 1/32 |
| JP | 2012007771 A | 1/2012 | | |
| WO | WO-2014128826 A1 | * 8/2014 | .............. | F25B 40/00 |

* cited by examiner

MODULAR HEAT EXCHANGER AND METHOD OF ASSEMBLY THEREOF

The present application claims priority from U.S. provisional patent application No. 63/171,963 filed on Apr. 7, 2021, incorporated herein by reference.

TECHNICAL FIELD

The present disclosure relates to heat exchangers, and more particularly to heat exchangers for recovering heat from wastewater.

BACKGROUND

Heat exchangers for commercial and residential purposes, for recovering heat potentially lost from wastewater, are usually costly to manufacture due to the presence of certain costly materials, such as copper. The structure of traditional heat exchangers also results in an increase of cost due to the labor required in shaping the small-coiled pipe for receiving the fresh around the main drainage pipe for evacuating the wastewater.

Moreover, these heat exchangers are difficult to install as they require the plumber to intervene after pipe installation, where the pipes are cut to position the heat exchanger.

Additionally, manufacturing of the heat exchanger requires selection of an appropriate fitting for joining to the freshwater inlet and outlet. Due to the variety of possible fittings that can be used, the joining of the fitting requires an additional step of connecting the neck of the fitting to the heat exchanger usually through soldering. This additional step is time-consuming and can result in property damage, due to the presence of an open flame involved for the soldering.

A more cost-effective heat exchanger for transferring heat from the expelled wastewater to the incoming freshwater would be advantageous.

SUMMARY

The present disclosure relates to a heat exchanger with a reduced manufacturing cost and that can be installed during the rough-in of building construction as a modular piece that is fitted onto and interconnecting the pipe ends of the building during installation of the pipes.

The present disclosure also relates to a fitting that is configured for joining to the outer pipe of the heat exchanger without requiring any soldering.

The present disclosure further relates to a connection between a coupling, for joining the heat exchanger to a pipe end of the building, to the inner pipe of the heat exchanger, where a lip at an end of the inner pipe fits into a receiving space located on an inside surface of the coupling.

A broad aspect is a heat exchanger for recovering heat from wastewater leaving a building and transferring the heat to freshwater for use in the building. The heat exchanger includes an inner pipe defining an inner space for receiving wastewater that is being evacuated from the building; an outer pipe, wherein the inner pipe is placed in the outer pipe, and the outer surface of the inner pipe and the inner surface of the outer pipe define an interstitial space for receiving freshwater, the outer pipe comprising: two fittings located at or near opposite ends of the outer pipe, wherein a first fitting of the two fittings is connectable to an inlet for receiving freshwater, and a second fitting of the two fittings is connectable to an outlet for letting out the freshwater once heated by passing through the interstitial space; a turbulator sheet located in the interstitial space that causes or increases turbulence of the freshwater for improving heat transfer between the freshwater and the inner pipe 109, separating the freshwater from the wastewater, the inner pipe 109 receiving the heat from the wastewater; and two couplings, one on either end of the outer pipe and the inner pipe, for sealing the interstitial space and securing the inner pipe and outer pipe together, wherein a first coupling of the two couplings connects the heat exchanger to a first end pipe, and wherein the second coupling of the two couplings connects the heat exchanger to a second end pipe, wherein once connected, the wastewater flows from one of the two end pipes through the inner space of the inner pipe to the second of the two end pipes.

In some embodiments, the turbulator layer may include a pattern of pyramid-shaped protrusions for enhancing the turbulence.

Another broad aspect is a heat exchanger for recovering heat from wastewater leaving a building and transferring the heat to freshwater for use in the building. The heat exchanger includes an inner pipe, composed of two layers of the same or different materials defining an inner space for receiving wastewater that is being evacuated from the building, the inner pipe comprising a tight spacing located between the two layers; and channels between the two layers that are defined by an increase in width of the tight spacing at specific intervals around the circumference of the inner pipe, the channels running along a length of the inner pipe, for permitting wastewater to pass through the channels if there is a leak in the inner pipe, the wastewater leaking out of the channels, indicative of a leak, wherein the outer layer is compressed on the inner layer while leaving sufficient room between the inner layer and the outer layer to define the tight spacing; an outer pipe, wherein the inner pipe is placed in the outer pipe defining an interstitial space for receiving freshwater, comprising two fittings, wherein a first fitting of the two fittings is connectable to an inlet for receiving freshwater, and a second of the two fittings is connectable to an outlet for letting out the freshwater, once heated; and two couplings, one on either end of the outer pipe and inner pipe, for sealing the interstitial space and securing the inner pipe and outer pipe together, wherein a first coupling of the two couplings connects the heat exchanger to a first end pipe, and wherein the second coupling of the two couplings connects the heat exchanger to a second end pipe, wherein once connected, the wastewater flows from one of the two end pipes through the inner space of the inner pipe to the second of the two end pipes.

Another broad aspect is a method of securing fittings to a heat exchanger configured to recover heat from wastewater leaving a building and transfer the heat to freshwater for use in the building. The method includes inserting a gooseneck fitting into an aperture, for receiving the fitting, of an outer pipe of the heat exchanger by accessing the aperture with the fitting through an inner space defined by the outer pipe; and positioning an inner pipe of the heat exchanger in the inner space of the outer pipe, wherein protrusions at a base of the fitting contact an outer surface of the inner pipe, wherein the contact between the outer surface of the inner pipe and the protrusions of the fitting prevents the fitting from falling from the aperture of the outer pipe, wherein the gooseneck fitting is free to rotate within the aperture of the outer pipe such that the orientation of the gooseneck fitting can be adjusted for connection to a pipe for receiving or expelling freshwater.

A broad aspect is a heat exchanger for recovering heat from wastewater leaving a building and transferring the heat to freshwater for use in the building. The heat exchanger includes an inner pipe defining an inner space for receiving wastewater that is being evacuated from the building; an outer pipe, wherein the inner pipe is placed in the outer pipe, and an outer surface of the inner pipe and an inner surface of the outer pipe define an interstitial space for receiving freshwater, the outer pipe comprising two fittings located at or near opposite ends of the outer pipe, wherein a first fitting of the two fittings is connectable to an inlet for receiving freshwater, and a second fitting of the two fittings is connectable to an outlet for letting out the freshwater once heated by passing through the interstitial space; a turbulator sheet located in the interstitial space that causes or increases turbulence of the freshwater; and whereby the inner pipe is connectable to a first end pipe and to a second end pipe through two couplings, the wastewater flowing from one of the two end pipes through the inner space of the inner pipe to the other of the two end pipes.

In some embodiments, the turbulator layer may include a pattern of pyramid-shaped protrusions for enhancing the turbulence.

In some embodiments, the pyramid-shaped protrusions may be perforated.

In some embodiments, the pattern of the turbulator layer may be achieved through sheet stamping.

In some embodiments, the heat exchanger may include the two couplings for sealing the interstitial space and securing the inner pipe and outer pipe together, wherein a first coupling of the two couplings connects the heat exchanger to the first end pipe, and wherein the second coupling of the two couplings connects the heat exchanger to the second end pipe.

In some embodiments, the inner pipe may be made of copper.

In some embodiments, the turbulator may cover a more than half of a perimeter of the interstitial space.

A broad aspect is a method of recovering heat from wastewater evacuated from a building. The method includes connecting the first end of the inner pipe of the heat exchanger as defined herein to the first end pipe using a first coupling; connecting a second end of the inner pipe to the second end pipe using a second coupling, wherein wastewater is enabled to flows from one of the two end pipes through the inner space of the inner pipe to the other of the two end pipes.

Another broad aspect is a heat exchanger for recovering heat from wastewater leaving a building and transferring the heat to freshwater for use in the building. The heat exchanger includes an inner pipe, composed of two layers defining an inner space for receiving wastewater that is being evacuated from the building, the inner pipe comprising a tight spacing located between the two layers; and channels between the two layers that are defined by an increase in width of the tight spacing at specific intervals around the circumference of the inner pipe, the channels running along a length of the inner pipe, for permitting wastewater to pass through the channels if there is a leak in the inner pipe, the wastewater leaking out of the channels, signaling the leak, wherein the outer layer is compressed on the inner layer while leaving sufficient room between the inner layer and the outer layer to define the tight spacing; an outer pipe, wherein the inner pipe is placed in the outer pipe defining an interstitial space for receiving freshwater, comprising two fittings, wherein a first fitting of the two fittings is connectable to an inlet for receiving freshwater, and a second of the two fittings is connectable to an outlet for letting out the freshwater, once heated, whereby the inner pipe is connectable to a first end pipe and to a second end pipe through two couplings, the wastewater flowing from one of the two end pipes through the inner space of the inner pipe to the other of the two end pipes.

In some embodiments, the heat exchanger may include the two couplings for sealing the interstitial space and securing the inner pipe and outer pipe together, wherein a first coupling of the two couplings connects the heat exchanger to the first end pipe, and wherein the second coupling of the two couplings connects the heat exchanger to the second end pipe.

In some embodiments, an inner layer of the two layers may be in copper and an outer layer of the two layers is in stainless steel.

In some embodiments, the channels may have a triangular cross-sectional shape.

Another broad aspect is a method of recovering heat from wastewater evacuated from a building. The method includes connecting the first end of the inner pipe of the heat exchanger as defined herein to the first end pipe using a first coupling; connecting a second end of the inner pipe to the second end pipe using a second coupling, wherein wastewater is enabled to flows from one of the two end pipes through the inner space of the inner pipe to the other of the two end pipes.

Another broad aspect is heat-exchanger fitting for connecting to a fresh-water inlet or outlet and for respectively enabling fresh-water entry in or fresh-water evacuation from a heat exchanger for recovering heat from wastewater leaving a building and transferring the heat to freshwater for use in the building. The fitting includes a hollow neck for connecting to the inlet or outlet; and a hollow base portion connected to the hollow neck, wherein a first width of the base at a junction of the hollow base and the hollow neck is smaller than a second width further from the hollow neck, wherein a larger second width compared to the first width is for preventing the fitting from falling from the heat exchanger due to fresh-water pressure circulating in the heat exchanger.

In some embodiments, the fitting may include openings located on the hollow base portion for enabling water to cross the hollow base portion through the openings.

In some embodiments, the hollow base portion may include a crenellation structure at an end of the hollow base portion opposite an end of the hollow base portion that connects with the hollow neck, and wherein the openings are the embrasures of the crenellation.

In some embodiments, outer surfaces of the merlons of the crenellation may be aligned with respect to a same plane.

In some embodiments, the openings may be holes positioned around the hollow base portion at a midpoint between a first end of the hollow base portion connecting to the hollow neck and a second end of the hollow base portion opposite the first end.

In some embodiments, the fitting may include an O-ring located at the junction of the hollow neck and the hollow base portion for preventing leakage when the fitting is connected to the heat exchanger.

In some embodiments, the hollow base portion may have a flared structured, resulting in the second width being larger than the first width.

In some embodiments, the hollow base portion may include abutments protruding outwardly resulting in the second width being larger than the first width.

In some embodiments, the hollow base portion may include a frustoconical shape, resulting in the second width being larger than the first width.

Another broad aspect is a heat-exchanger for recovering heat from wastewater leaving a building and transferring the heat to freshwater for use in the building comprising the fitting as defined herein.

Another broad aspect is a heat-exchanger fitting for connecting to a fresh-water inlet or outlet and for respectively enabling fresh-water entry in or fresh-water evacuation from a heat exchanger for recovering heat from wastewater leaving a building and transferring the heat to freshwater for use in the building. The fitting includes a hollow neck for connecting to the inlet or outlet; and a hollow base portion connected to the hollow neck, for occupying an interstitial space for receiving freshwater defined by an inner pipe and outer pipe of the heat exchanger, comprising openings located on the hollow base portion for enabling water to move across the hollow base portion, through the openings.

In some embodiments, the openings may be holes positioned around the hollow base portion at a midpoint between a first end of the hollow base portion connecting to the next and a second end of the hollow base portion opposite the first end.

In some embodiments, the hollow base portion may include a crenellation structure at an end of the hollow base portion opposite an end of the hollow base portion that connects with the hollow neck, along a perimeter of the hollow base portion, and wherein the openings are the embrasures of the crenellation structure.

In some embodiments, outer surfaces of the merlons of the crenellation structure may be parallel with respect to one-another.

In some embodiments, the fitting may include an O-ring located at a junction of the hollow neck and the hollow base portion for preventing leakage when the fitting is connected to the heat exchanger.

Another broad aspect is a heat-exchanger for recovering heat from wastewater leaving a building and transferring the heat to freshwater for use in the building comprising the fitting as defined herein.

Another broad aspect is a method of securing a fitting to a heat exchanger configured to recover heat from wastewater leaving a building and transfer the heat to freshwater for use in the building. The method includes inserting a fitting with a neck into an aperture, for receiving the fitting, of an outer pipe of the heat exchanger by accessing the aperture with the fitting through an inner space defined by the outer pipe, wherein a base portion of the fitting remains in the inner space following the inserting; and positioning an inner pipe of the heat exchanger in the inner space of the outer pipe, wherein a contact between an outer surface of the inner pipe and the base portion of the fitting prevents the fitting from falling from the aperture of the outer pipe, wherein the fitting is free to rotate within the aperture of the outer pipe such that the orientation of a neck of the fitting can be adjusted for connection to an inlet for receiving freshwater or an outlet for expelling freshwater.

In some embodiments, the base portion of the fitting may include protrusions, and protrusions contact the outer surface of the inner pipe, wherein the contact between the outer surface of the inner pipe and the protrusions of the base portion of the fitting prevents the fitting from falling from the aperture of the outer pipe.

In some embodiments, the protrusions may be merlons, the base portion having a crenellation structure.

In some embodiments, the neck may be a gooseneck.

In some embodiments, an O-ring may seal the aperture into which the fitting is inserted.

Another broad aspect is a method of manufacturing a fitting for connecting to a fresh-water inlet or outlet and for respectively enabling fresh-water entry in or fresh-water evacuation from a heat exchanger for recovering heat from wastewater leaving a building and transferring the heat to freshwater for use in the building. The method includes adding a hollow neck, for connecting to the inlet or outlet, to a hollow base portion, wherein a first width of the hollow base portion at a junction of the hollow base portion and the neck is smaller than a second width further from a site when the hollow neck joins the hollow base portion, wherein a larger second width compared to the first width is for preventing the fitting from falling from the heat exchanger due to fresh-water pressure circulating in the heat exchanger.

In some embodiments, the hollow base portion may include openings located on the hollow base portion for enabling water to cross the hollow base portion through the openings.

In some embodiments, the hollow base portion may include a crenellation structure at an end of the base opposite an end of the hollow base portion that is configured to join with the hollow neck, the crenellation structure running along the perimeter of the hollow base portion, and wherein the openings are the embrasures of the crenellation.

In some embodiments, outer surfaces of the merlons of the crenellation may be aligned with respect to a same plane.

In some embodiments, the openings may be holes positioned around the hollow base portion at a midpoint between a first end of the hollow base portion for joining to the hollow neck and a second end of the hollow base portion opposite the first end.

In some embodiments, the hollo base portion may have a flared structured, resulting in the second width being larger than the first width.

In some embodiments, the hollow base portion may include abutments protruding outwardly resulting in the second width being larger than the first width.

In some embodiments, the hollow base portion may include a frustoconical shape, resulting in the second width being larger than the first width.

Another broad aspect is a heat exchanger for recovering heat from wastewater leaving a building and transferring the heat to freshwater for use in the building. The heat exchanger includes an inner pipe defining an inner space for receiving wastewater that is being evacuated from the building, wherein a first end of the inner pipe and a second end of the inner pipe include a lip; an outer pipe, wherein the inner pipe is placed in the outer pipe, and the outer surface of the inner pipe and the inner surface of the outer pipe define an interstitial space for receiving freshwater, the outer pipe comprising two fittings located at or near opposite ends of the outer pipe, wherein a first fitting of the two fittings is connectable to an inlet for receiving freshwater, and a second fitting of the two fittings is connectable to an outlet for letting out the freshwater once heated by passing through the interstitial space; and two couplings, one on either end of the outer pipe and the inner pipe, for securing the inner pipe and outer pipe together, wherein a first coupling of the two couplings connects the heat exchanger to a first end pipe, and wherein the second coupling of the two couplings connects the heat exchanger to a second end pipe, wherein once connected, the wastewater flows from one of the two end pipes through the inner space of the inner pipe to the second of the two end pipes, wherein the lip of the first end of the inner pipe inserts into a space of a first coupling of the two couplings to secure the inner pipe to the first coupling, and the lip of the second end of the inner pipe inserts into a space of a second coupling of the two couplings to secure the inner pipe to the second coupling.

In some embodiments, the lip at the first end may result from a flare at the first end; and/or the lip at the second end may result from a flare at the second end.

In some embodiments, a plane defining the lip at the first end may be orthogonal with a surface of the inner pipe; and/or a plane defining the lip at the second end may be orthogonal with a surface of the inner pipe.

In some embodiments, a plane defining the lip at the first end may be obtuse with a surface of the inner pipe; and/or a plane defining the lip at the second end is obtuse with a surface of the inner pipe.

Another broad aspect is a method of recovering heat from wastewater evacuated from a building. The method includes connecting the first end of the inner pipe of the heat exchanger as defined herein to the first end pipe using the first coupling; connecting the second end of the inner pipe to the second end pipe using the second coupling, wherein wastewater is enabled to flows from one of the two end pipes through the inner space of the inner pipe to the second of the two end pipes.

Another broad aspect is a method of fastening a coupling to an end of an inner pipe of a heat exchanger for recovering heat from wastewater leaving a building and transferring the heat to freshwater for use in the building, comprising securing a first lip at a first end of the inner pipe into a corresponding space located on an inner surface of the coupling, the securing of the lip in the space resulting in the fastening of the coupling to the inner pipe.

In some embodiments, the first lip may result from a flare at the first end of the inner pipe.

In some embodiments, the method may include securing a second lip at a second end of the inner pipe, opposite the first end, into a corresponding space located on an inner surface of an additional coupling, the securing of the second lip resulting in the fastening of the additional coupling to the inner pipe.

In some embodiments, the coupling may be joined to a first end pipe of a building, the additional coupling is joined to a second end pipe of the building, enabling wastewater to flow from one of the first end pipe and second end pipe into the inner pipe and into the other of the first end pipe or second end pipe.

BRIEF DESCRIPTION OF THE DRAWINGS

The invention will be better understood by way of the following detailed description of embodiments of the invention with reference to the appended drawings, in which.

DETAILED DESCRIPTION

The present disclosure relates to a heat exchanger for recovering heat from wastewater and parts relating to same. The heat exchanger is installed between two end pipes of a building (e.g. a portion of the pipe of the building can be cut, and the heat exchanger can be installed between the two end pipes of the severed pipe of the building, the couplings of the heat exchanger interconnecting the inner pipe of the heat exchanger and the end pipes of the building).

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

From the foregoing it will be appreciated that, although specific embodiments have been described herein for purposes of illustration, various modifications may be made without deviating from the spirit and scope of the teachings. Accordingly, the claims are not limited by the disclosed embodiments.

Reference is made to FIG. 1, FIG. 3, FIG. 5 and FIG. 6, illustrating an exemplary heat exchanger 100.

The heat exchanger 100 includes an inner pipe 109 (e.g. smooth) that can be composed of two layers 105 and 106 that can be of different materials (e.g. outer layer in stainless steel; inner layer in copper) for passing wastewater exiting the building.

Figure 1:
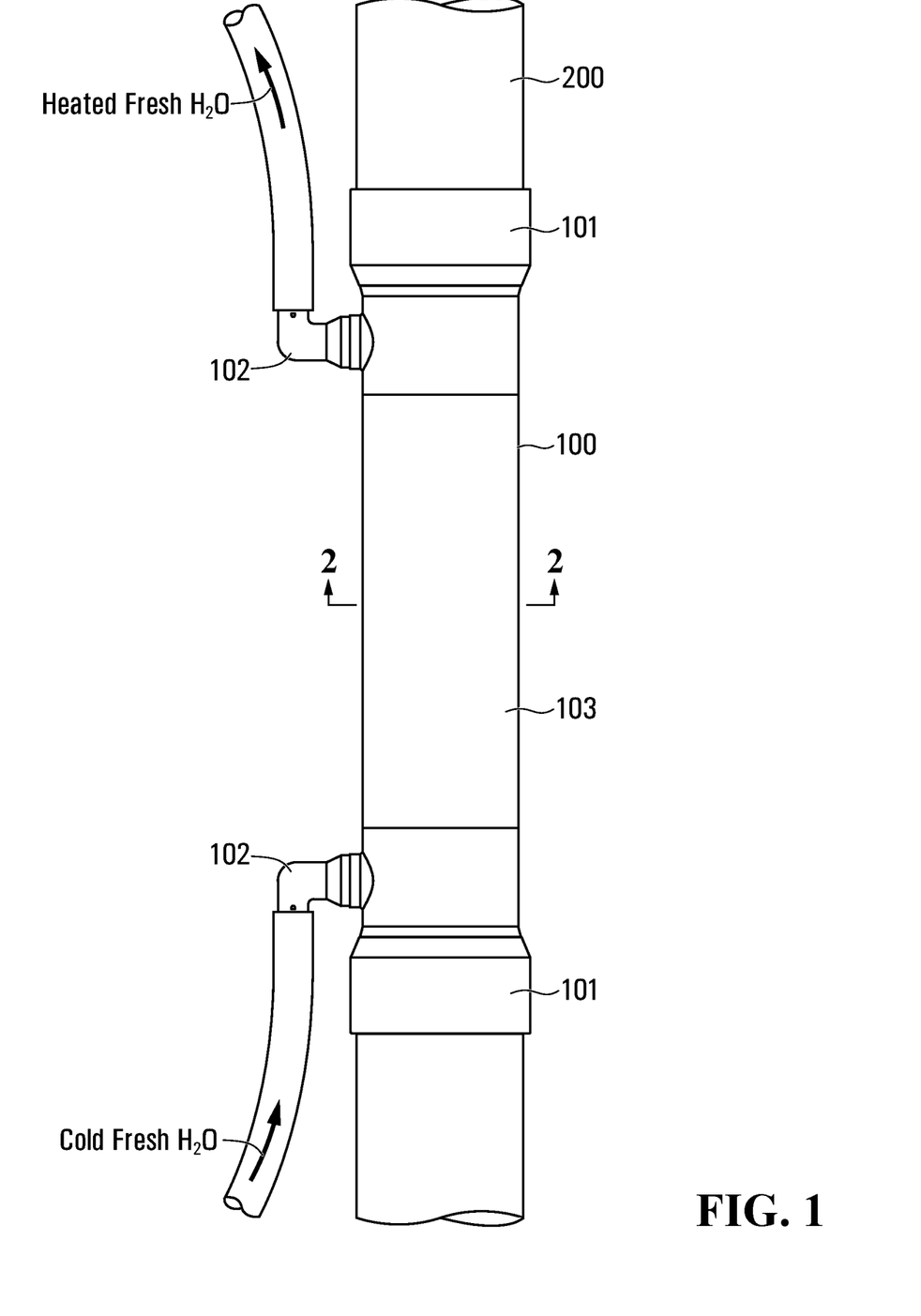
FIG. 1 is a drawing of a front view of an exemplary modular heat exchanger, interconnecting two pipe ends, in accordance with the present teachings.
Figure 2:
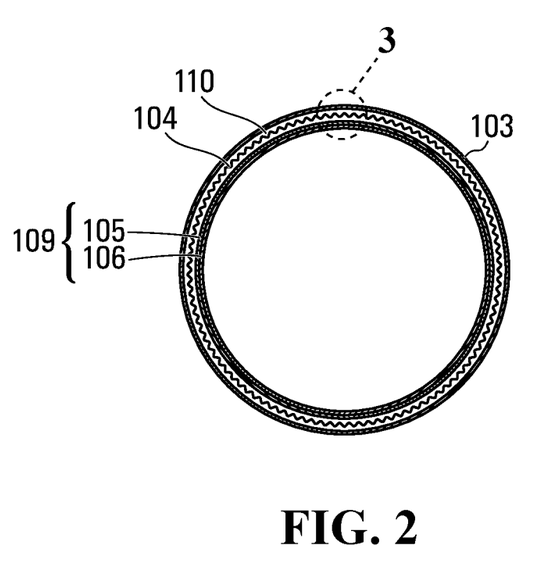
FIG. 2 is a drawing of a cross-sectional view of the exemplary modular heat exchanger of FIG. 1.
Figure 3:
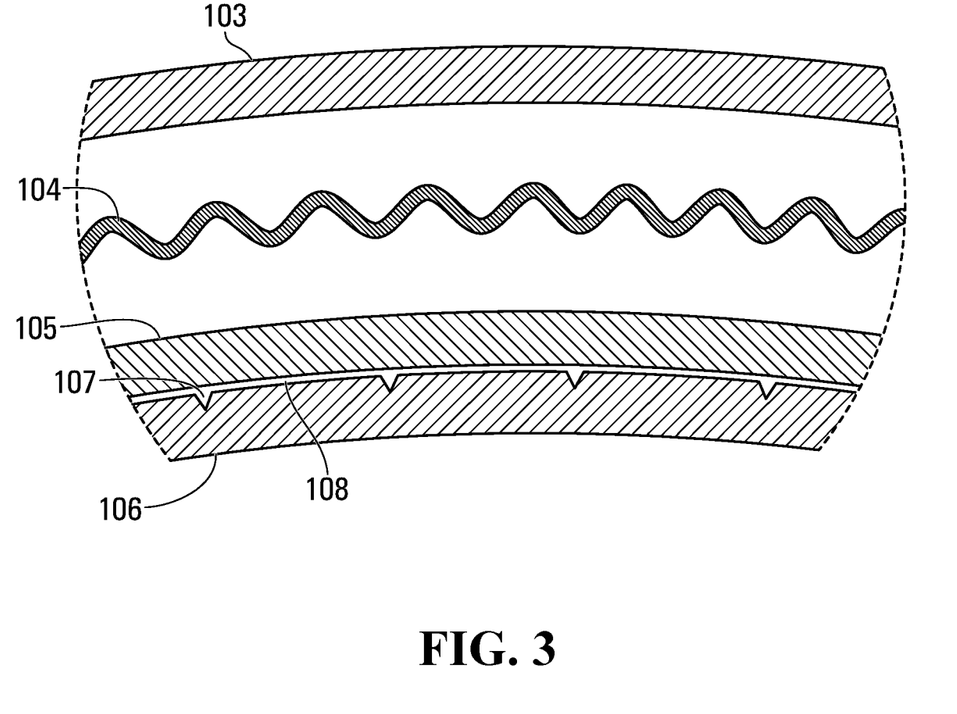
FIG. 3 is a drawing of a blown-up portion of the cross-sectional view of the exemplary heat exchanger of FIG. 2.

When the inner pipe 109 contains two layers, the inner pipe 109 (e.g. smooth) includes a tight spacing 108 defined between the two layers 105 and 106. Channels 107 are defined between the two layers 105 and 106 as an increase in width of the tight spacing 108 at specific intervals around the circumference of the inner pipe 109, the channels 107 running along the length of the inner pipe 109, for permitting wastewater to pass through the channels 107 if there is a leak in the inner layer 106 of the inner pipe 109, the wastewater leaking out of the channels 107, indicative of a leak (the leakage from the heat exchanger visible to signal the presence of a leak within the heat exchanger, to avoid contamination of the freshwater with the wastewater).

The cross-sectional shape of the channels 107 may be a triangle, a half-moon, etc. It will be understood that the cross-sectional shape of the channels 107 may vary without departing from the present teachings, provided the shape is sufficient to enable the wastewater to pass through and out of the heat exchanger 100, to signal a leak, such that the wastewater does not intermix with the freshwater.

The outer layer 105 of the inner pipe 109 is compressed on the inner layer 106 of the inner pipe 109 while leaving sufficient room between the two to define the tight spacing 108.

Figure 5:
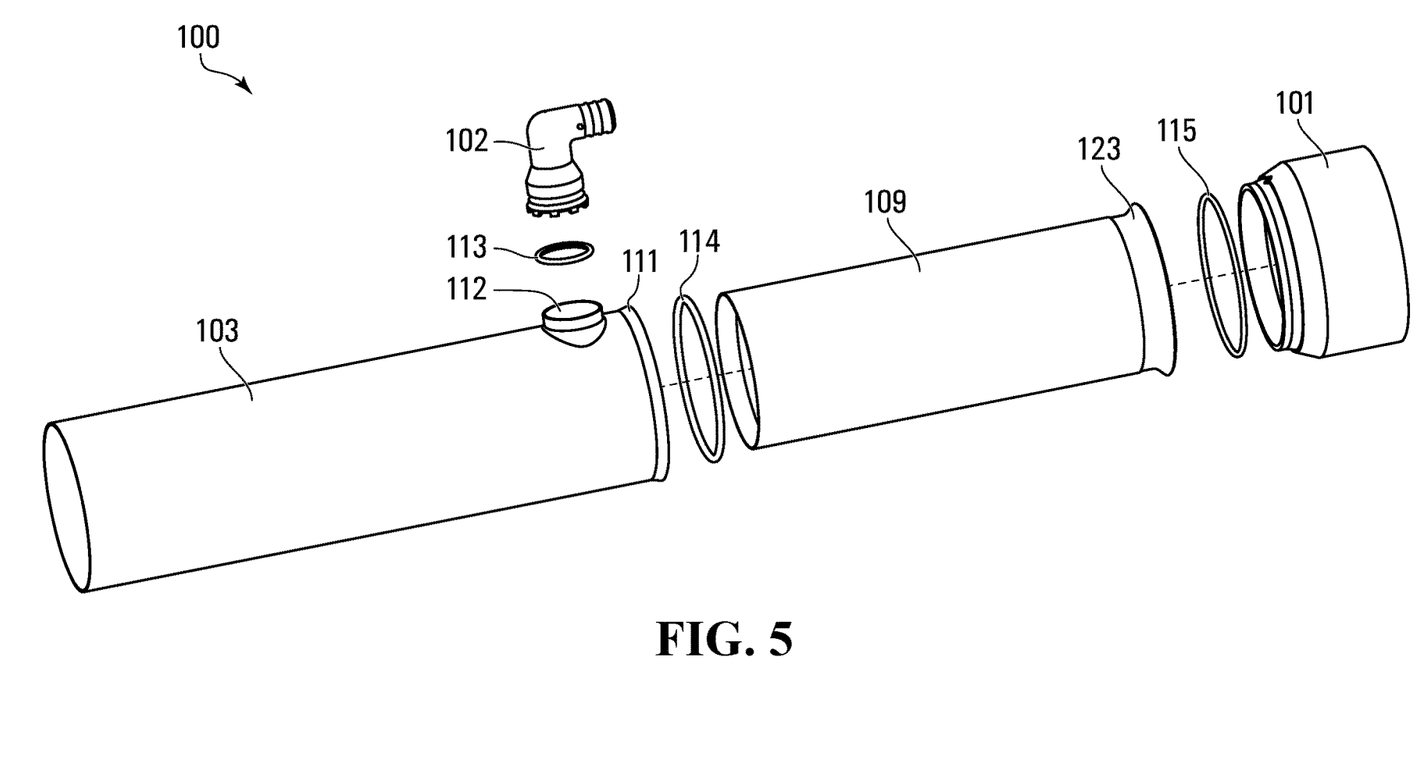
FIG. 5 is a drawing of a blown-up perspective view of an exemplary heat exchanger in accordance with the present teachings.
Figure 6:
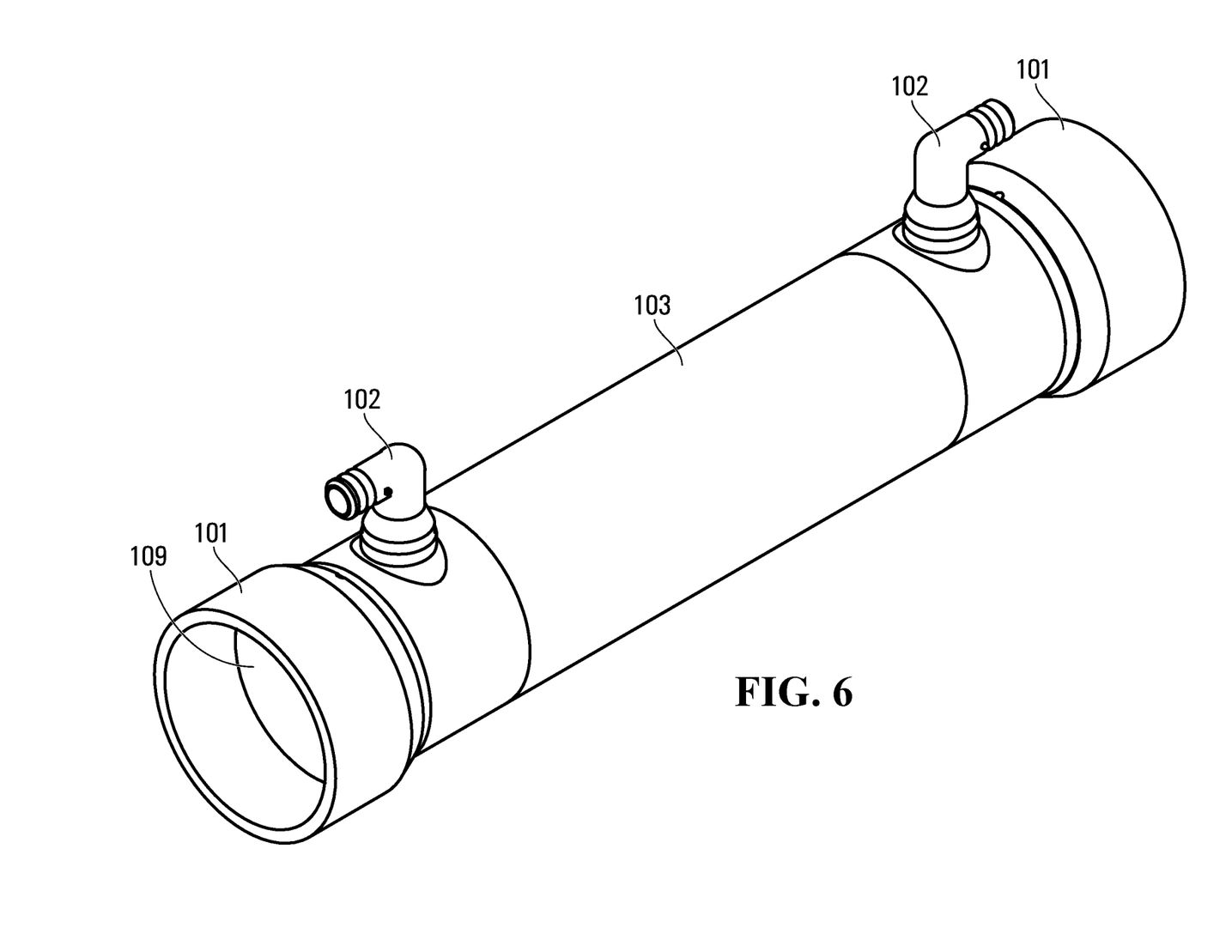
FIG. 6 is a drawing of a perspective view of an exemplary heat exchanger in accordance with the present teachings.

The outer pipe 103 includes two apertures 112 for receiving detachable fittings 102, wherein each of the fittings 102 fits into one of the two apertures 112, and each of the fittings 102 can rotate freely once fitted into their respective aperture 112.

As shown in FIG. 5, illustrating a blown-up exemplary heat exchanger 100, O-ring 115 is provided to seal the space between the inner pipe 109 (at lip 123) and the coupling 101. O-ring 114 is used to seal the space between the inner layer 109 and the outer pipe 103. O-ring 113 is used to seal the space between the walls of the aperture 112 and the fitting 102. O-ring 113, O-ring 114 and/or O-ring 115 can be made from an elastomeric material.

During assembly of the heat exchanger 100, prior to the insertion of the inner pipe 109 into the outer pipe 103, the fittings 102 can be introduced into each of the apertures 112 through the inner space defined by the outer pipe 103. Each of the fittings 102 includes a hollow base portion with, in some embodiments, legs or protrusions, configured to rest on the outer wall of the inner pipe 109 once the inner pipe 109 is inserted into the outer pipe 103. The hollow base portion (e.g. with the protrusions) of the fitting 102 prevents the fitting 102 from falling out of the aperture 112 by abutting on the outer surface of the inner pipe 109, as explained herein.

The inner pipe 109 is placed in the outer pipe 103. The inner pipe 109 and outer pipe 103 define an interstitial space 110 for receiving freshwater through a first of the two fittings 102, the freshwater passing through the interstitial space 110 where the freshwater is heated through heat exchange with the wastewater passing through and exiting the inner pipe 109, the heated freshwater exiting from a second of the two fittings 102, serving as the freshwater outlet. The heated freshwater can be redirected to, e.g., the hot water tank of the building, thereby reducing the cost of energy required to heat the water.

In some embodiments, a turbulator layer 104 may be located in the interstitial space 110, the turbulator layer 104 sandwiched between the outer pipe 103 and the inner pipe 109.

Figure 4A:
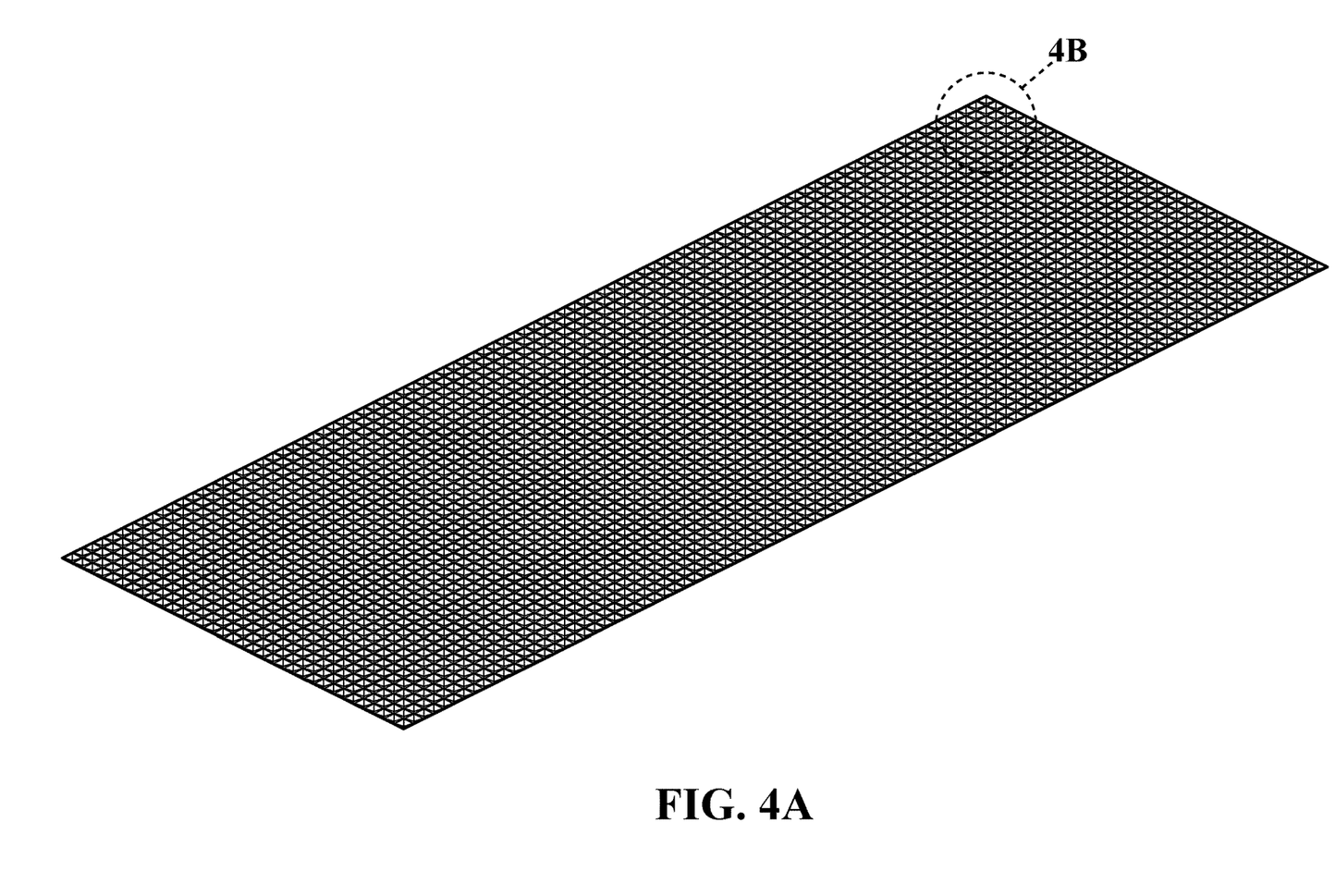
FIG. 4A is a picture of a portion of an exemplary turbulator layer of an exemplary heat exchanger in accordance with the present teachings.

In preferred embodiments, the turbulator layer 104 is shaped as a sheet, wrapping around at least a portion of the inner pipe 109, with a pattern of shapes creating an arrangement of raises and depressions. In some instances, the pattern of shapes is that of pyramid-shaped protrusions for causing or increasing turbulence of the freshwater passing through the interstitial layer 104, for improving heat transfer between the freshwater and the wastewater, as shown in FIG. 4A.

Figure 4B:
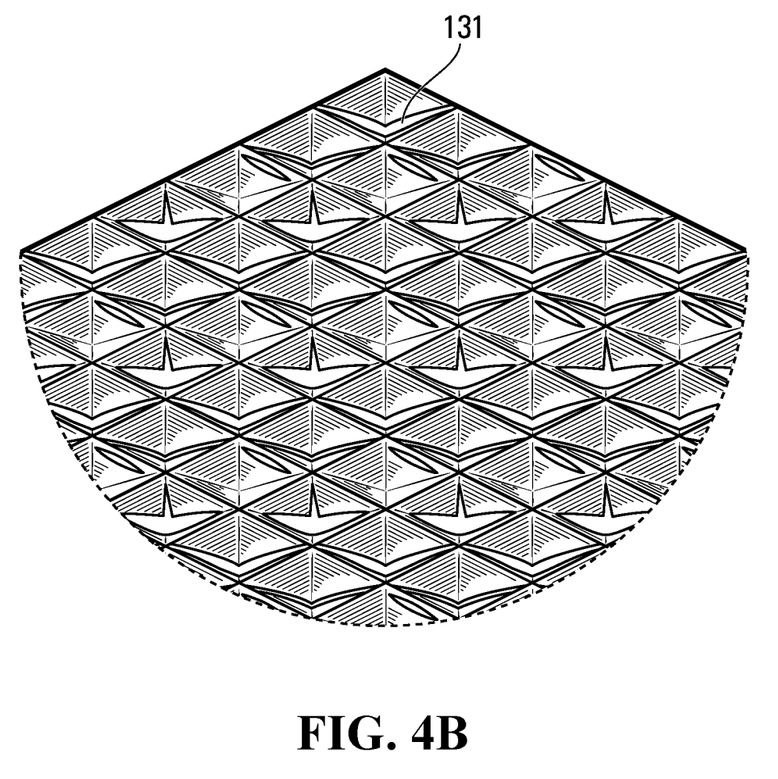
FIG. 4B is a picture of a portion of another exemplary turbulator layer of an exemplary heat exchanger in accordance with the present teachings.

In some examples, as shown in FIG. 4B, the turbulator layer 104 may include, in its pattern, perforations 131, enabling flow of freshwater through the turbulator layer 104, furthering the mixtures of freshwater in the interstitial space 110. The presence of perforations 131 may also reduce impedance of the passage of freshwater by the turbulator layer 104 as the freshwater travels through the interstitial space 110, as well as increase the heat transfer efficiency between the freshwater and the inner pipe 109.

For instance, a row of perforations (e.g. triangle-shaped perforations) may be present after one or two rows of pyramid protrusions. In some instances, the pyramids may include perforations at their summits, which may resemble a cheese grater pattern.

FIG. 4B represents a preferred embodiment of a turbulator layer 104 for mixing the freshwater, increasing heat transfer efficiency between the freshwater and the inner pipe 109. FIG. 4B illustrates a mixture of pyramid-shaped protrusions along with perforations 131 defined by the walls of pyramid-shaped protrusions, the walls creating a space that is the perforation 130. The orientation of the walls of the protrusions may cause the openings 131 to face different directions.

It will be understood that the shapes and perforations that result in the pattern of the turbulator layer 104 may vary. For instance, in one instance, the pattern is that of semi-spherical domes, causing rises on one side of the turbulator layer 104 and depressions on the other side of the turbulator layer 104. In some examples, the pattern of the turbulator layer 104 may be obtained through sheet stamping.

In some examples, when a turbulator layer 104 is present in the interstitial space 110, the hollow base portion 121 of the fitting 102 may instead rest on the turbulator 104 instead of on the outer surface of the inner pipe 109.

Two integral non-removable plastic couplings 101, one on either end of the outer pipe 103 and inner pipe 109, seal the interstitial space 110 and secure the inner pipe 103 and outer pipe together 109. Each of the couplings 101 can then be inserted on its respective end pipe 200.

Figure 8:
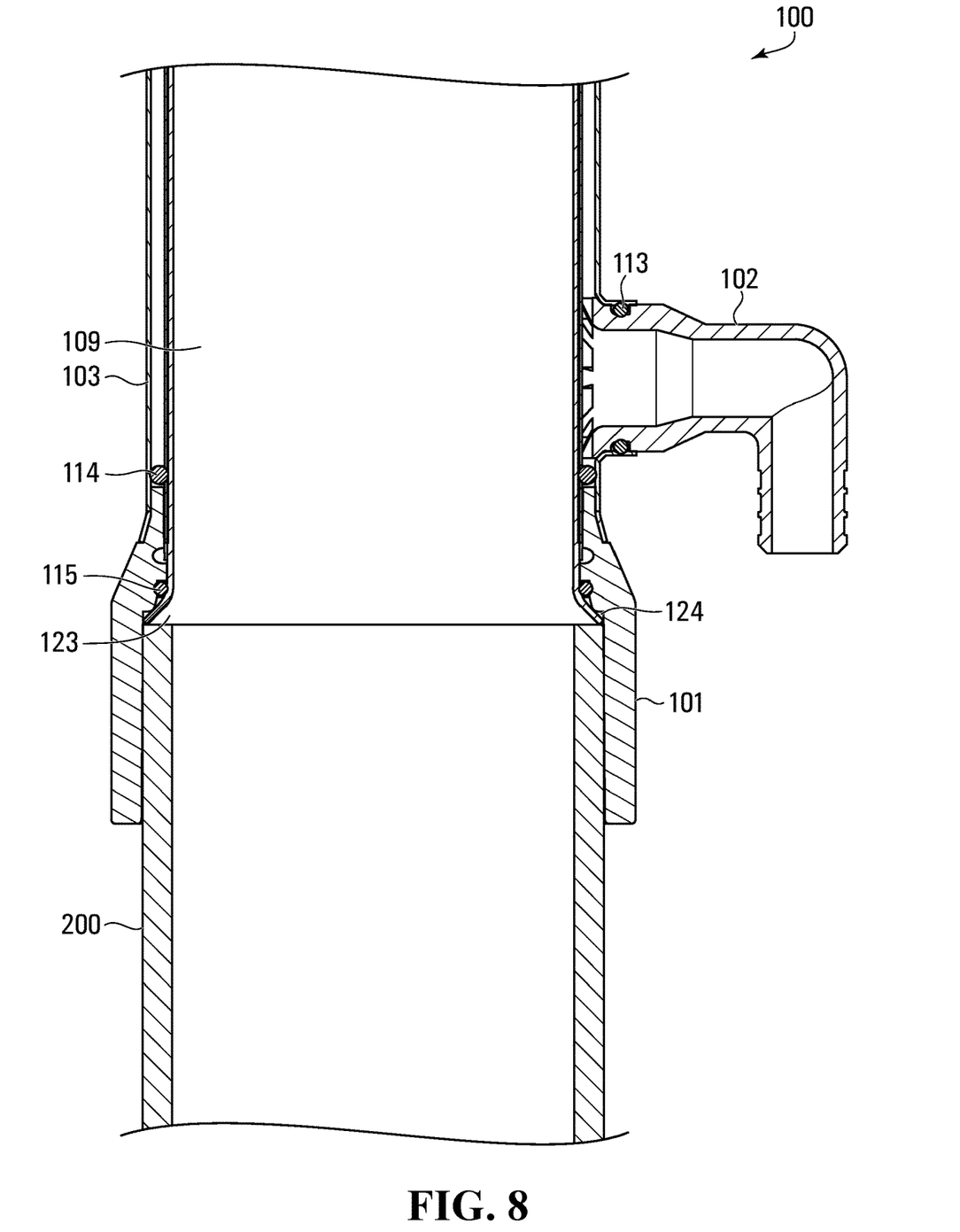
FIG. 8 is a drawing of a cross section of an exemplary portion of a heat exchanger mounted onto an exemplary end pipe of a building, illustrating an exemplary lip of an inner pipe of the heat exchanger secured to a space of the coupling of the heat exchanger.

As shown in FIG. 8, in some examples, the inner pipe 109 of the heat exchanger 100 may fasten to the coupling through the use of a lip 123 located at and end of the inner pipe 109. The lip 123 fits into a space 124 dedicated to receiving the lip 123 on the coupling 101 (a space 124 located on an inner surface of the coupling 101, e.g. the coupling having a cylindrical shape that is larger that the inner pipe 109 and the end pipe 200).

In some embodiments, the lip 123 may be the result of a flare at the end of inner pipe 109. In some examples, a plane defining the lip 123 may be orthogonal with the surface of the inner pipe 109, the lip 123 extending perpendicularly outward, away from the cylindrical surface of the inner pipe 109.

In some embodiments, a plane defining the lip 123 may be obtuse with the surface of the inner pipe 109.

In some embodiments, the lip 123 can be shaped around the entire perimeter of the inner pipe 109. In other embodiments, the lip 123 can be shaped around one or more portions of the inner pipe 109. For instance, the lip 123 can have two or more portions or extensions, followed by spaces around the perimeter of the inner pipe 109 where the lip 123 is not present, for fitting into the inner space 124 of the coupling. It will be understood that the inner space 124 of the coupling 101 can be adapted as a function of the shape of the lip 123, such that the lip 123 can fit and be secured in the inner space 124, resulting in a tight fit, for securing the inner pipe 109 to the coupling 101. An O-ring 115 may also be present between the coupling 101 and the inner pipe 109.

In some embodiments, the outer pipe 103 of the heat exchanger 100 may also include a lip 111. The shape of the lip 111 may be adapted for hugging the shape of the coupling 101 and improving the positioning between the inner pipe 109 and the outer pipe 103 with the O-ring 114 to improve the seal between the coupling 101 and the outer pipe 103.

Figure 7A:
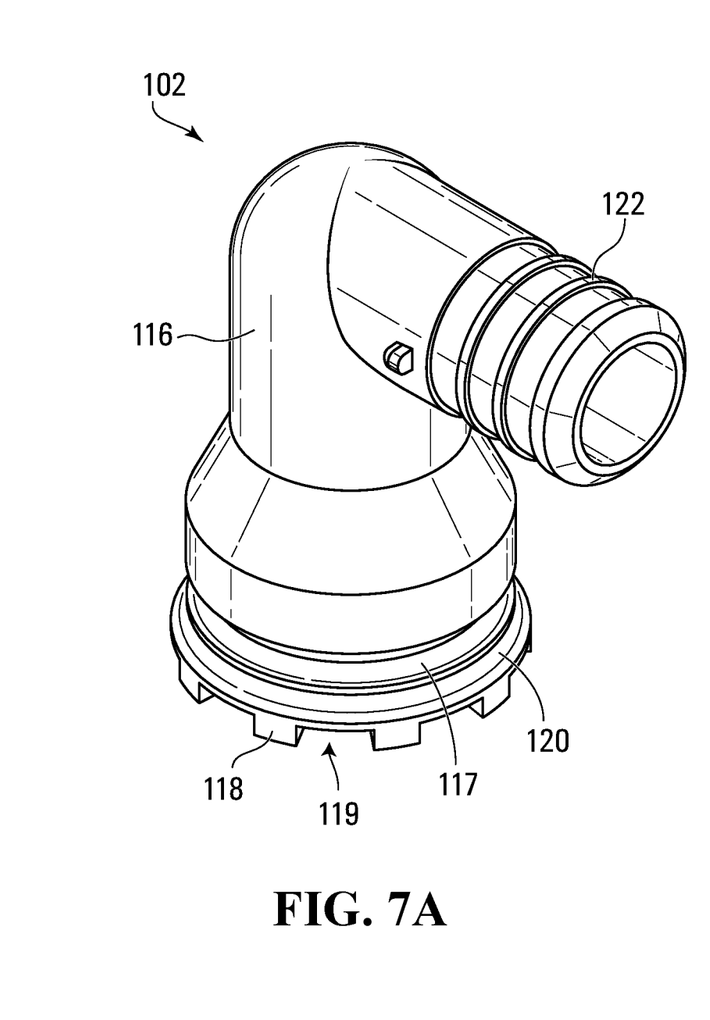
FIG. 7A is a drawing of a perspective view of an exemplary fitting in accordance with the present teachings.
Figure 7B:
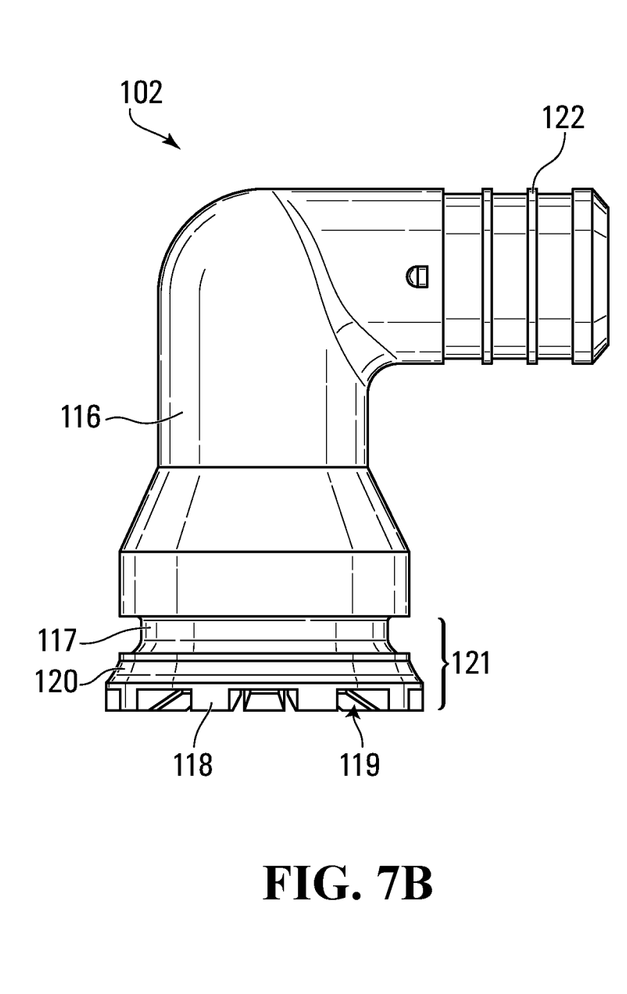
FIG. 7B is a drawing of a side view of the exemplary fitting of FIG. 7A.

An Exemplary Fitting for a Heat Exchanger:

Reference is made to FIGS. 7A and 7B, illustrating an exemplary fitting 102 for joining to the heat exchanger 100 (the outer pipe 103 of the heat exchanger 100). In exemplary heat exchangers, two fittings 102 are added, one for receiving freshwater originating from a freshwater inlet, the other for evacuating freshwater, once heated by the evacuating wastewater, acting as a freshwater outlet.

The fitting 102 is configured to be secured to the outer pipe 103 through an application of mechanical force, the fitting inserted through an aperture 112 of the outer pipe 103, held securely in an aperture 112 of the outer pipe 103 as a result of the shape of the fitting 102.

The shape of fitting 102 is also configured to withstand water pressure entering the heat exchanger 100 and flowing through the interstitial space 110 of the heat exchanger 100, the shape preventing the fitting 102 from dislodging from its aperture 112 as a result of the water pressure or another external force.

Moreover, when manufacturing the fittings 102, the fitting 102 includes a universal hollow base portion 121 that can be joined to or designed with a variety of necks for interconnecting with different kinds of piping. As a result, the base of the fitting 102 does not have to be tailored to each application for the fitting 102, only the neck.

The fitting 102 includes a hollow base portion 121 and a hollow neck portion 116. The hollow base portion 121 is joined to the hollow neck portion 116. The hollow base portion 121 and the hollow neck portion 116 may be designed as separate components, such that an appropriate hollow neck portion 116 may be selected for joining to the hollow base portion 121 depending on the application for the fitting 102, the application defining the shape and properties of the hollow neck portion 116.

The hollow base portion 121 and the hollow neck portion 116 are hollow for allowing the freshwater to pass therethrough (i.e. away from or into the heat exchanger 100).

The hollow base portion 121 includes a depression portion 117 for meeting with the inner wall of the aperture 112 of the outer pipe 103. An O-ring may be positioned between the inner wall of the aperture 112 and the depression portion 117 during assembly of the fitting 102 to the outer pipe 103.

The hollow base portion 121 includes a mid-portion 120 having a width that is greater than the depression portion 117. As a result, the hollow base portion 121 has a width that is lesser at the junction of the hollow base portion 121 than further from the junction between the hollow base portion 121 and the hollow neck portion 116 (the junction being where the depression portion 117 of the hollow base portion 121 meets the hollow neck portion 116).

The mid-portion 120 may have a frustoconical shape, where the smaller base of the frustoconical-shaped mid-portion 120 is located closer to the depression portion 117 than the larger base of the frustoconical-shaped mid-portion 120 (as shown in FIGS. 7A and 7B).

In some examples, not shown, the mid-portion 120 may have a greater width than the width of the depression portion 117 as a result of projections extending away from the outer surface of the mid-portion 120. The projections of the mid-portion 120 are to contact the inner surface of the outer pipe 103 when the fitting 102 is inserted into the aperture 112, the increased width of the mid-portion 120 caused by the projections, when compared to the depression portion 117, acting as a barrier for preventing the fitting 102 from falling out of the inner pipe 103 as a result of heated freshwater leaving the heat exchanger 100.

In some examples, not shown, the mid-portion 120 may include a ring protruding from the outer surface of the mid-portion 120, resulting in the increased width of the mid-portion 120 when compared to the width of the depression portion 117.

In some examples, not shown, the mid-portion 120 may include one or more bumps or one or more rolls raised from the outer surface of the mid-portion 120, resulting in the increased width of the mid-portion 120 when compared to the width of the depression portion 117.

A base, at the end of the mid-portion 120, of the hollow base portion 121 is configured to rest on an outer wall of the inner pipe 109. The contact between the base of the hollow base portion 121 and the inner pipe 109 prevents the fitting 102 from falling back, through the aperture 102, into the interstitial space 110 of the heat exchanger 100 as a result of freshwater flowing into the heat exchanger 100, exerting a force towards the heat exchanger 100 (or when exposed to other mechanical forces exerted on the fitting 102, such as vibration, outer piping connecting to the fitting 102, etc.)

The base of the hollow base portion 121 may include protrusions 118 for creating a contact with the outer surface of the inner pipe 109, e.g. when the fitting 102 is pushed towards the inner pipe 109. The hollow base portion 121 may also include openings 119 for enabling the freshwater flowing through the interstitial space 110 of the heat exchanger 100 to not be impeded by the presence of the hollow base portion 121 in the interstitial space 110. The openings 119 may be holes located along a surface of the hollow base portion 121 (e.g. at the mid-portion 120). In some examples, the openings 119 may be located at the base of the hollow base portion 121, resulting from depressions created between each of the protrusions 118 as shown in FIGS. 7A and 7B. The pattern of the protrusions 118 and depressions 119 may result in a crenellation, the protrusions 119 acting as merlons and the openings 119 acting as embrasures.

The outer surfaces of the protrusions 119 may be parallel with respect to one another. In some examples, the outer surfaces of the protrusion may be configured to extend outwardly, the protrusions 118 adding to the width of the hollow base portion 121, the outer surface of the protrusion 118 facing towards the hollow neck 116 of the fitting 102.

The hollow neck 116 can be designed as a part separate from the hollow base portion 121. A specific hollow neck 116 can be selected to join to the hollow base portion 121 depending on the tubing or piping to which the hollow neck 116 is to be connected.

The hollow neck 116 may include ridges or other geometries proper for specific fitting types and requirements (such as ridges 122) for joining to the tubing or piping of the building (i.e. for allowing freshwater to flow from or flow to the heat exchanger). The dimensions, shape (e.g. straight, a gooseneck, etc.) of the hollow neck 116 may vary depending on its use (e.g. the properties of the tubing or piping of the building to which the hollow neck 116 is to join).

Figure 9:
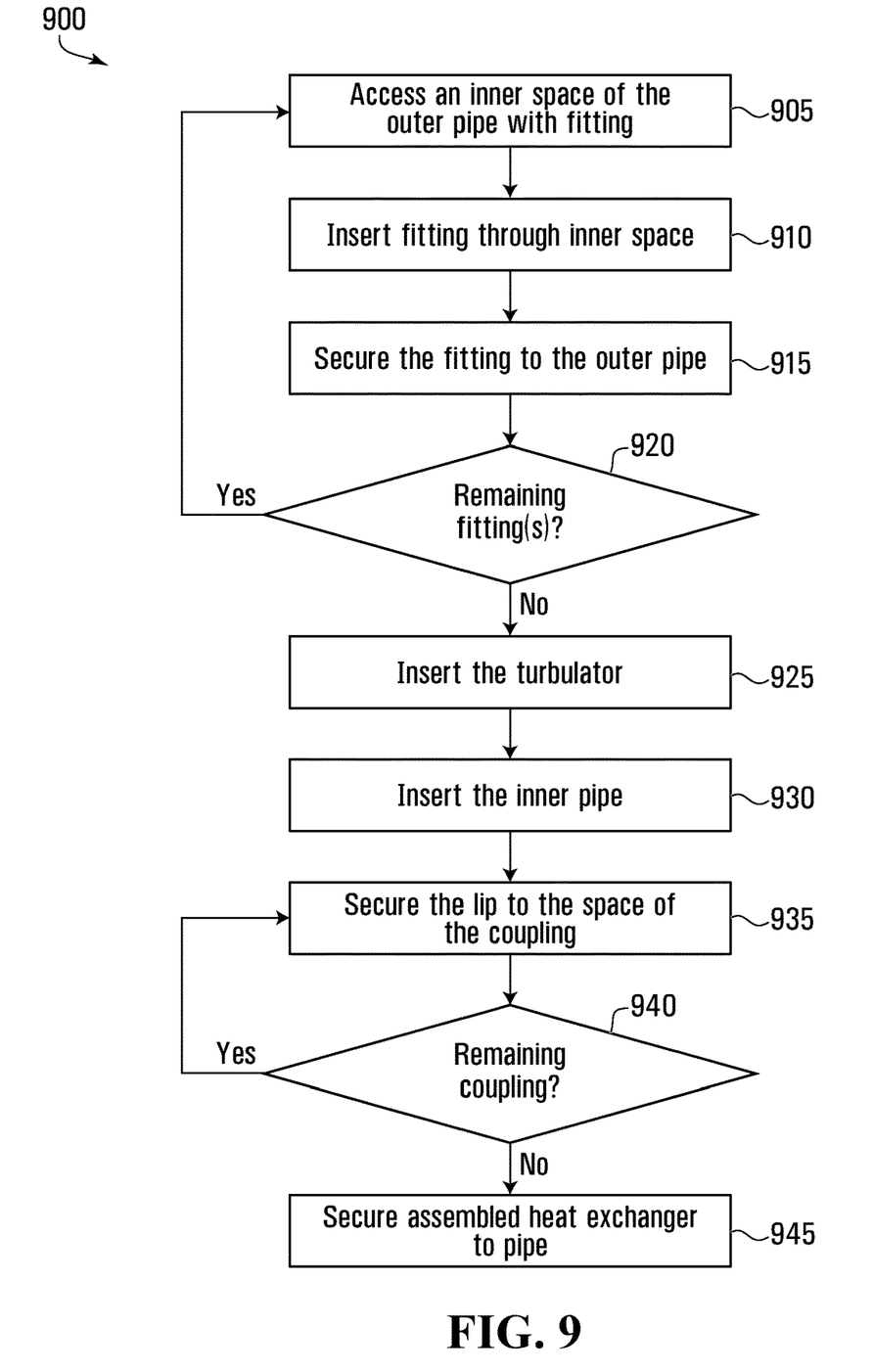
FIG. 9 is a flowchart diagram of an exemplary method of assembly of a heat exchanger in accordance with the present teachings.

Exemplary Method of Assembling a Heat Exchanger for Recovering Heat from Wastewater:

Reference is now made to FIG. 9, illustrating an exemplary method 900 of assembling (e.g. during manufacturing; prior to installation, etc.) a heat exchanger for recovering heat from wastewater. For purpose of illustration, reference will be made to exemplary heat exchanger 100. However, it will be understood that any other heat exchanger in accordance with the present teachings may be assembled by performing method 900.

A fitting 102 accesses an inner space of an outer pipe 103, the fitting 102 passed through the inner space of the outer pipe 103 toward an aperture 112 at step 905.

The fitting 102, located in the inner space of the outer pipe 103, is then inserted into an aperture 112 of the outer space 103, the hollow neck 116 emerging from the inner space of the outer pipe 103 out of the aperture 112, the hollow neck 116 extending out and away from the outer pipe at step 910.

The fitting 102 is then secured into place in the aperture 112 when the depression portion 117 is aligned with the walls of the outer pipe 103 surrounding the aperture 112. The fitting 102 may rotate in the aperture 112, once inserted. The fitting 102 locks into place when the depression portion 117 is fitted into the aperture 112. An O-ring may also be added between the fitting 102 (e.g. the depression portion 117) and the aperture 112 to seal any remaining space between the fitting 102 and the aperture 112, for avoiding water leakage through the aperture 112.

The passing of the hollow neck 116 of the fitting 102 into the aperture 112, until the depression portion 117 fits into the aperture 112, results in the securing of the fitting 102 to the outer pipe 103. A difference in width between the depression portion 117 and the mid-portion 120, as well as between the depression portion 117 and the hollow neck 106, results in the locking of the fitting 102 and the outer pipe 103.

When the fitting 102 is secured to the outer pipe 103, a portion of the hollow base portion 121 (e.g. the mid-portion 120 and the base of the hollow base portion 121) is still contained in the inner space of the outer pipe 103.

As a heat exchanger 100 includes two fittings 102 (one for permitting entry of freshwater into the heat exchanger, the other for permitting evacuation of the heated freshwater from the heat exchanger), if an additional fitting 102 remains to be secured to the outer pipe 103 at step 920, steps 905 to 915 are repeated.

It will also be understood that steps 905 to 915 constitute a method of securing a fitting (e.g. fitting 102) in accordance with the present teachings to a heat exchanger.

Once the fitting 102 is secured in the aperture 112 of the outer pipe 103, the fitting 102 can be rotated around to a desired orientation for connecting the fitting 102 to piping of the building, the rotation facilitating the connection and avoiding unnecessary joints and bends in the piping of the building.

When all of the fittings 102 are secured to the outer pipe 103, in some examples, a turbulator layer 104 may be inserted into the inner space of the outer pipe 103. The turbulator layer 104 may be a sheet that is a shaped to make the circumference of the outer pipe 103.

When a turbulator layer 104 is added to the heat exchanger 100 at step 925, the base of the fitting 102 may rest on the turbulator layer 104.

The inner pipe 109 is inserted into the inner space of the outer pipe 103 at step 930. The outer surface of the inner pipe 109 and the inner surface of the outer pipe 103 define the interstitial space 110 of the heat exchanger 100 for receiving the freshwater that will be heated due to heat transferred from the wastewater, prior to the freshwater exiting the heat exchanger 100.

When a turbulator layer 104 is added to the heat exchanger 100, the turbulator layer 104 fits in the interstitial space 110, between the inner pipe 109 and the outer pipe 103.

When a turbulator layer 104 is absent from the heat exchanger 100 or only covers portions of the interstitial space 110, the base of the fitting 102 is configured to contact the outer surface of the inner pipe 109 when subject to, e.g., water pressure pushing the fitting 102 inwardly, towards the inner pipe 109. The contact between the inner pipe 109 and the base of the fitting 102 prevents the fitting 102 from falling into the inner space of the outer pipe 103, the inner pipe 109 acting as a barrier, limiting undesirable movement of the fitting 102.

The couplings 101 are then secured to the inner pipe 109, contacting the outer pipe 103 at step 935. The couplings 101 can seal the interstitial space 110, for retaining freshwater in the interstitial space 110.

The coupling 101 connects with the inner pipe 109 through a lip 123 of the inner pipe 109 that protrudes outwardly from the inner pipe 109. The lip 123 fits into a space 124 defined on an inner surface of the coupling 101, shaped to receive and lip 123. The interlocking of the lip 123 and the space 124 due to an increase in the width of the inner pipe 109 caused by the lip 123, at the end of the inner pipe 109, and the change in the width of the inner space of the coupling 101 caused by the space 124 cause the locking. Mechanical force may be applied to push the lip 123 into the space 124. When the lip 123 results from a gradual flare at the end of the inner pipe 109, the fitting the lip 123 into the space 124 requires less mechanical force than the removal of the lip 123 from the space 124.

The outer pipe 103 may also include a lip 111 for joining with the coupling 101, for increasing an alignment of the inner pipe 109 and the outer pipe 13 to improve the seal between the coupling 101 and the outer pipe 103.

It will be understood that step 935 may define a method of connecting an inner pipe of a heat exchanger, the inner pipe having a lip at the end of the inner pipe, to a coupling of the heat exchanger, the coupling having a space for receiving the lip of the inner pipe.

As the heat exchanger 100 can have one coupling 101 at each end of the heat exchanger 100, if an additional coupling 101 has not yet been secured to the inner pipe 109 at step 940, step 935 may be repeated for the additional coupling.

If both couplings 101 have been secured to the inner pipe 109, then the assembled heat exchanger 100 may be connected to the piping of the building at step 945.

Each coupling 101 serves as a sleeve for joining the inner pipe 109 to an end pipe of the building.

Piping (e.g. cross-linked polyethylene, PEX) can be connected to each of the fittings 102, for enabling freshwater, to be heated, to enter and exit, once heated, the interstitial space 110 of the heat exchanger 100.

Wastewater passes from one end pipe, through the inner pipe 109, to the other end pipe. As the wastewater passes through the inner pipe 109, the freshwater travelling through the interstitial space 110 is heated, by heat exchange initiated through the walls of the inner pipe 109, by the evacuated wastewater. Once heated, the freshwater leaves the heat exchanger 100 through the fitting 102 opposite to the one through which the freshwater entered.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. A heat exchanger for recovering heat from wastewater leaving a building and transferring the heat to freshwater for use in the building comprising:
    an inner pipe defining an inner space for receiving wastewater that is being evacuated from the building;
    an outer pipe, wherein the inner pipe is placed in the outer pipe, and an outer surface of the inner pipe and an inner surface of the outer pipe define an interstitial space for receiving freshwater, the outer pipe comprising two fittings located at or near opposite ends of the outer pipe, wherein a first fitting of the two fittings is connectable to an inlet for receiving freshwater, and a second fitting of the two fittings is connectable to an outlet for letting out the freshwater once heated by passing through the interstitial space;
    wherein each fitting of the two fittings comprises:
        a hollow neck for connecting to the inlet or the outlet; and
        a hollow base portion connected to the hollow neck, wherein a first width of the fitting at a junction of the hollow base and the hollow neck is smaller than a second width along the hollow base portion further from the hollow neck, wherein the fitting is prevented from falling from the heat exchanger by having the hollow base portion contact the outer surface of the inner pipe;
    a turbulator sheet located in the interstitial space that causes or increases turbulence of the freshwater; and
    whereby the inner pipe is connectable to a first end pipe and to a second end pipe through two couplings, the wastewater flowing from one of the two end pipes through the inner space of the inner pipe to the other of the two end pipes.

2. The heat exchanger of claim 1, wherein the turbulator layer includes a pattern of pyramid-shaped protrusions for enhancing the turbulence.

3. The heat exchanger as defined in claim 2, wherein the pyramid-shaped protrusions are perforated.

4. The heat exchanger as defined in claim 2, wherein the pattern of the turbulator layer is achieved through sheet stamping.

5. The heat exchanger as defined in claim 1, further comprising the two couplings for sealing the interstitial space and securing the inner pipe and outer pipe together, wherein a first coupling of the two couplings connects the heat exchanger to the first end pipe, and wherein the second coupling of the two couplings connects the heat exchanger to the second end pipe.

6. The heat exchanger as defined in claim 1, wherein the inner pipe is made of copper.

7. The heat exchanger as defined in claim 1, wherein the turbulator covers more than half of a perimeter of the interstitial space.

8. A method of recovering heat from wastewater evacuated from a building, comprising:
    connecting a first end of the inner pipe of the heat exchanger as defined in claim 1 to the first end pipe using a first coupling;
    connecting a second end of the inner pipe to the second end pipe using a second coupling,
    wherein wastewater is enabled to flows from one of the two end pipes through the inner space of the inner pipe to the other of the two end pipes.

9. The heat exchanger as defined in claim 1, where each fitting of the two fittings further comprises openings located on the hollow base portion for enabling water to cross the hollow base portion through the openings.

10. The heat exchanger as defined in claim 9, wherein the hollow base portion of each fitting of the two fittings further comprises a crenellation structure at an end of the hollow base portion opposite an end of the hollow base portion that connects with the hollow neck, and wherein the openings are the embrasures of the crenellation.

11. The heat exchanger as defined in claim 9, wherein the openings are holes positioned around the hollow base portion at a midpoint between a first end of the hollow base portion connecting to the hollow neck and a second end of the hollow base portion opposite the first end.

12. The heat exchanger as defined in claim 1, where each fitting of the two fittings further comprises an O-ring located at the junction of the hollow neck and the hollow base portion for preventing leakage when the fitting is connected to the heat exchanger.

13. The heat exchanger as defined in claim 1, wherein the hollow base portion of each fitting of the two fittings has a flared structured, resulting in the second width being larger than the first width.

14. The heat exchanger as defined in claim 1, wherein the hollow base portion of each fitting of the two fittings includes abutments protruding outwardly resulting in the second width being larger than the first width.

15. The heat exchanger as defined in claim 1, wherein the hollow base portion of each fitting of the two fittings includes has a frustoconical shape, resulting in the second width being larger than the first width.

* * * * *